Feb. 11, 1969  E. E. HANSON  3,426,863

POWER STEERING APPARATUS

Filed May 11, 1967

INVENTOR.
EUGENE E. HANSON
BY
Hood, Gust, & Irish
ATTORNEYS

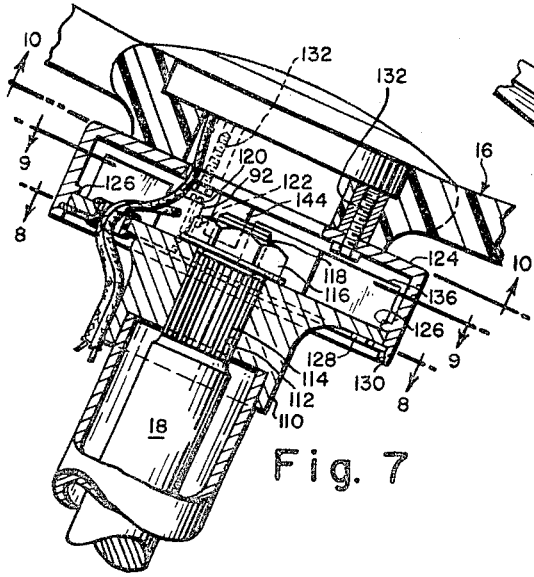

United States Patent Office 3,426,863
Patented Feb. 11, 1969

3,426,863
POWER STEERING APPARATUS
Eugene E. Hanson, Fort Lauderdale, Fla., assignor to Ceepo Manufacturing Company, Hialeah, Fla., a corporation of Florida
Filed May 11, 1967, Ser. No. 637,774
U.S. Cl. 180—79.2
Int. Cl. B62d 5/00
8 Claims

ABSTRACT OF THE DISCLOSURE

A power steering apparatus comprising fluid-actuated means for controllably pivoting conventional knuckle assemblies, electrically-operated valve means for controlling said fluid-actuated means, and switch means dominating said valve means, the switch means being arranged so that rotation of the steering wheel causes operation of the valve means. In a preferred embodiment, means are provided for permitting relative, resiliently resisted rotation of the steering wheel on the steering column, the switch means being operated by such relative rotation.

---

The present invention relates generally to power steering apparatus, and more particularly to such apparatus comprising electrically-operated valve means for controlling fluid-actuated means for pivoting conventional knuckle assemblies.

Prior art, electrically-controlled power steering devices have suffered several disadvantages, the main disadvantage being the lack of smooth operation which is absolutely necessary to a vehicle on the highway.

It is a primary object of the present invention, therefore, to provide an electrically-controlled power steering apparatus which will provide for smooth operation of the steering mechanism of a vehicle. The means and methods for providing such smooth operation will be discussed as this description progresses.

The power steering apparatus of the present invention, which may be used in combination with vehicles having conventional manual steering systems, comprises fluid-actuated means for controllably pivoting conventional knuckle assemblies, thereby steering the vehicle, electrically-operated valve means for controlling the fluid-actuated means and switch means dominating the valve means. Of course, a pressurized fluid source and an electrical power source must be provided for energizing the power steering apparatus. In a preferred embodiment of the present invention, means are provided for permitting relative, resiliently resisted rotation of the steering wheel on the steering column of the manual steering system. The switch means, which dominates the valve means, is carried on the steering column so that, when the steering wheel is rotated a predetermined amount relative to the steering column, the switch means will energize the valve means which, in turn, operates the fluid-actuated means. Such an arrangement provides for the smooth operation which characterizes the power steering apparatus of the present invention.

It will be noted that the power steering apparatus of the present invention is disclosed and claimed in combination with a conventional manual steering system comprising a steering wheel, steering column, knuckle assemblies, and means drivingly connecting the steering column to the knuckle assemblies. In a conventional manual steering system, the means for drivingly connecting the steering column to the knuckle assemblies includes a gear reduction of, say, approximately 24 to 1. Thus, by placing the switch means which dominates the valve means so that the switch means is operated directly by rotation of the steering wheel, a much smoother operation is obtained than would be obtained if the switch means were positioned to be operated through the gear reduction. By providing for relative, resiliently resisted rotation of the steering wheel on the steering column, and since the switch means is operated by such relative rotation, the steering column is urged in the proper direction by the steering wheel before the switch means is operated to energize the power steering apparatus. Thus, by adjusting the springs which resiliently resist the rotation of the steering wheel relative to the steering column, the sensitivity of the power steering apparatus can be adjusted.

It is another object of the present invention, therefore, to provide, in an electrically-controlled power steering apparatus, switch means arranged to be operated by rotation of the steering wheel relative to the steering column, such relative rotation being resiliently resisted.

Still further objects will appear as the description proceeds.

In the drawings:

FIG. 7 is a partially sectioned view taken from FIG. 1 generally along the line 7—7 showing the switch assembly which is disposed between the steering wheel and the steering column;

FIG. 8 is a sectional view taken from FIG. 7 generally along the line 8—8;

FIG. 9 is a sectional view taken from FIG. 7 generally along the line 9—9;

FIG. 10 is a sectional view taken from FIG. 7 generally along the line 10—10;

FIG. 11 is a sectional view taken from FIG. 3 generally along the line 11—11; and FIG. 12 is a sectional view taken from FIG. 5 generally along the line 12—12.

Figures 1, 2:
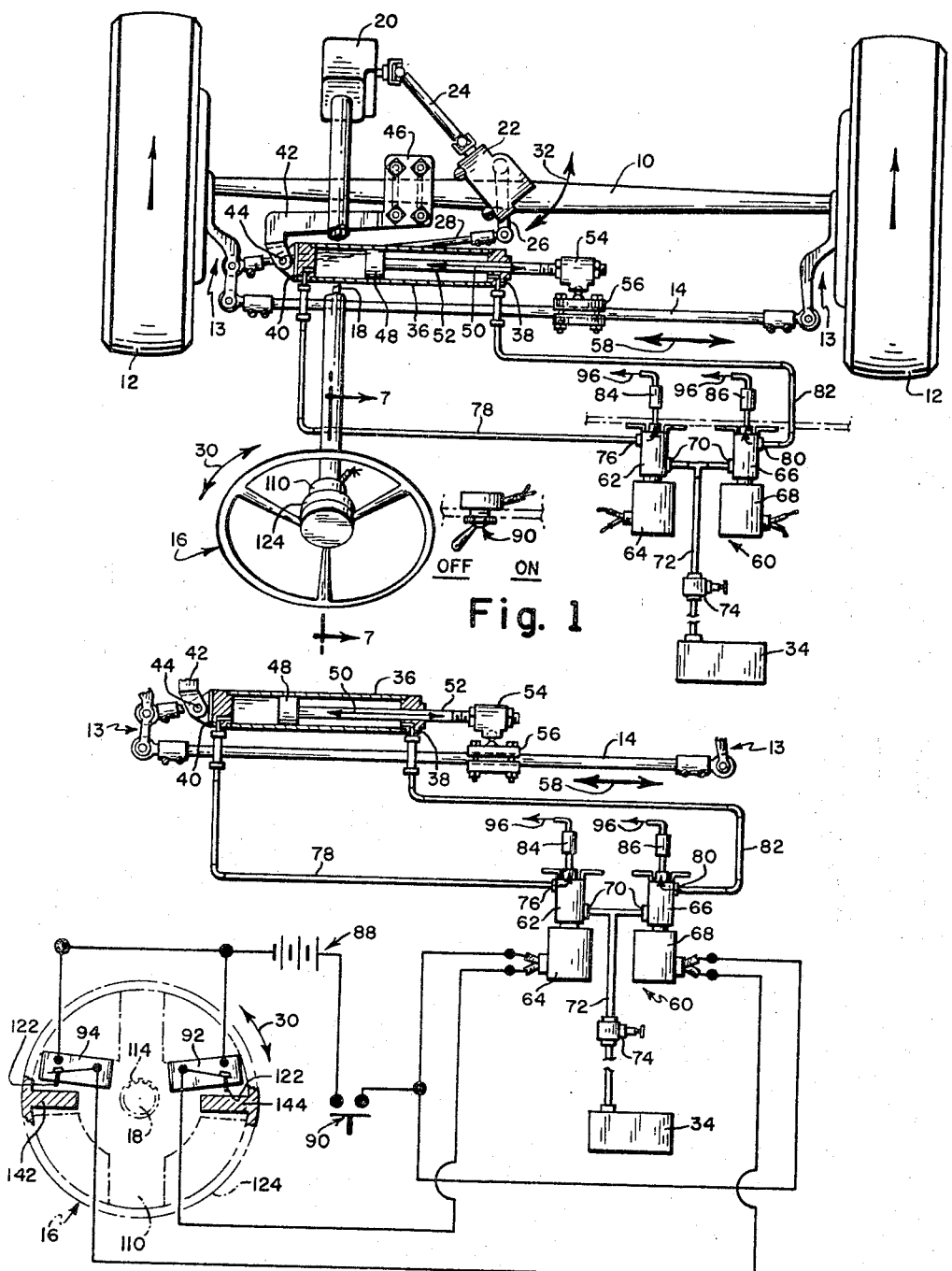
FIG. 1 is a diagrammatic view of a front axle assembly, conventional manual steering system and the electrically-controlled power steering apparatus of the present invention, the power steering apparatus being shown de-energized.
FIG. 2 is a schematic drawing of the power steering apparatus showing the apparatus de-energized so as not to impede the operation of the manual steering system.

Referring to FIG. 1, it will be seen that a portion of the vehicle embodying the steering system of the present invention as well as the conventional manual steering system is illustrated. The vehicle may constitute a conventional passenger car, bus, truck, earth moving machine, etc., and includes an axle 10, the axle extending between a pair of wheels 12 in a conventional manner. The wheels are mounted for movement as a unit about substantially vertical axes by means of conventional knuckle assemblies, indicated generally by the reference number 13, carried by the axle 10, the knuckle assemblies 13 being tied together by a tie rod 14 which extends generally parallel to the axle 10.

The vehicle includes a manually rotatable or operator-controlled steering wheel 16 attached to a steering column 18, the steering column 18 being drivingly connected through a gear reduction system to the knuckle assemblies 13. In the illustrative embodiment, the gear reduction system includes the gear box 20 and the gear box 22 and a drive shaft 24 connecting the gear boxes 20 and 22. A conventional pitman arm 26 and drag link 28 connect the gear box 22 to the left knuckle assembly 13, as shown in FIG. 1.

The system described thus far is conventional in that rotation of the steering wheel 16 results in a corresponding movement of the pitman arm 26. That is, when the steering wheel 16 is turned in the direction of the arrow 30, the pitman arm 26 is pivoted in the direction of the arrow 32 to turn the wheels 12 to the left, as viewed in FIG. 1. Of course, when the steering wheel is turned in a direction opposite to the arrow 30, the pitman arm 26 is pivoted in a direction opposite to the arrow 32 and the wheels 12 are turned to the right.

The power steering apparatus of the present invention is arranged to assist the manual steering system discussed above. Referring to FIGS. 1 and 2, it will be seen that the power steering system comprises a pressurized fluid source 34 which may be an air compressor, hydraulic pump or the like, preferably driven by the vehicle engine. For the purpose of describing the illustrative embodiment, it will be assumed that the fluid source 34 is an air compressor. The power steering apparatus further comprises an air cylinder 36 pivotally mounted on the front axle assembly 10, the air cylinder 36 having an input port at each of its ends as indicated by the reference numbers 38 and 40. Specifically, the air cylinder 36 is pivotally connected to a bracket 42 as indicated at 44, the bracket 42 being securely fastened to the axle assembly 10 as indicated at 46. A piston 48 is arranged for reciprocation in the cylinder 36 between the ports 38 and 40 as indicated by the arrow 50, the piston 48 being connected to a piston rod 52 which penetrates one end of the air cylinder 36. As seen in FIG. 1, the piston rod 52 is pivotally connected to the tie rod 14 by means such as the ball-type retainer 54 and associated split ball-type bracket 56. Such connection means 54 and 56 are well known in the art and need not be discussed, in detail, in this description. It will be noted, however, that the air cylinder 36 is free to pivot about the point 44 and that the piston rod 52 is pivotal about the ball-type retainer 54. Such a pivotal connection arrangement is required because the tie rod 14 moves inwardly and outwardly relative to the axle assembly 10 as well as in the direction of length of the axle assembly 10. When air is admitted to the air cylinder 36 through the input port 40, the piston 48 and tie rod 14 are urged in the direction of the arrow 58 and when air is admitted to the air cylinder 36 through the input port 38, the piston 48 and tie rod 14 are urged in a direction opposite to the arrow 58. Since the tie rod 14 is connected to both of the knuckle assemblies 13, reciprocation of the tie rod 14 by the air cylinder 36 causes the wheels 12 to be pivoted about their vertical axes.

The power steering apparatus further comprises an electrically-operated valve means, indicated generally by the reference number 60, connected between the fluid source 34 is an air compressor. The power steering apparated valve means 60 comprises a valve 62 dominated by a solenoid 64 and a valve 66 dominated by a solenoid 68. The fluid source 34 is connected to the input ports 70 of the valves 62 and 66 by a fluid line 72 in which is disposed a pressure-regulating valve 74. The output port 76 of the valve 62 is connected to the input port 40 by a fluid line 78. The output port 80 of the valve 66 is connected to the input port 38 by the fluid line 82. The valve 62 is provided with an exhaust port 84 which is open when the solenoid 64 is de-energized and the valve 66 is provided with a similar exhaust port 86 which is open when the solenoid 68 is de-energized.

One side of an electrical power source 88, which may preferably be the conventional vehicle battery, is connected to the solenoids 64 and 68 through a main power switch, indicated generally by the reference number 90, and the other side of the power source 88 is connected to the solenoid 64 through a microswitch 92 and to the solenoid 68 through a microswitch 94. Thus, when the main power switch 90 is open (in its "OFF" position as indicated in FIG. 1), the solenoids 64 and 68 are de-energized and the exhaust ports 84 and 86 are open so that the piston 48 can reciprocate freely in the air cylinder 36 when the tie rod 14 is shifted by the manual steering system. That is, when the power steering apparatus is de-energized, the piston 48 is free to reciprocate in the direction of the arrow 50 because the air displaced by the piston 48 can move out the exhaust ports 84 and 86 as indicated by the arrows 96.

The valves 62 and 66, solenoids 64 and 68, main power switch 90 and microswitches 92 and 94 are all well known in the art and need not be discussed, in detail, in this description.

When the main power switch 90 is closed (in the "ON" position as indicated in FIG. 1), the solenoid 64 is energized when the microswitch 92 is closed and the solenoid 68 is energized when the microswitch 94 is closed. It will be seen as this description progresses that when one of the microswitches 92 or 94 is closed, the other microswitch 92 or 94 is, necessarily, open. When the solenoid 64 is energized, fluid can move from the fluid source 34 through the line 72, valve 62, line 78 and input port 40 to drive the piston to the right as viewed in FIGS. 1 and 2. Similarly, when the solenoid 68 is energized, fluid can move through the line 72, valve 66, line 82 and port 38 to drive the piston 48 to the left as viewed in FIGS. 1 and 2. The operation of the power steering apparatus will be best understood by referring to FIGS. 3 and 4 which show the wheels 12 being turned to the right and then to FIGS. 5 and 6 which show the wheels 12 being turned to the left.

Figure 3:
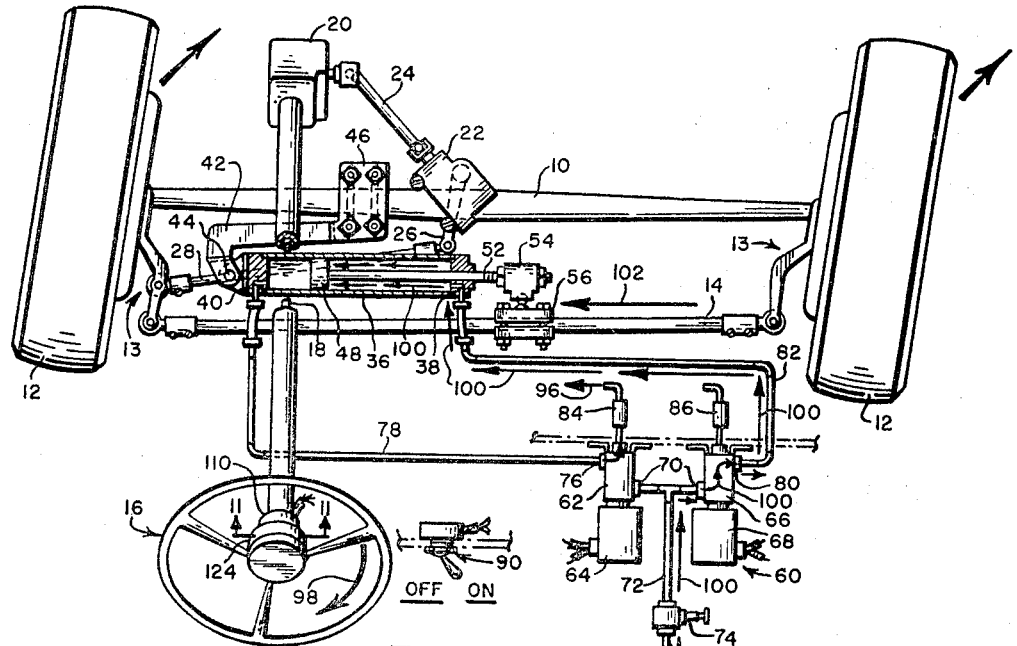
FIG. 3 is a diagrammatic view, similar to FIG. 1, showing the power steering apparatus energized, the steering wheel turned to the right and, consequently, the wheels turned to the right.
Figure 4:
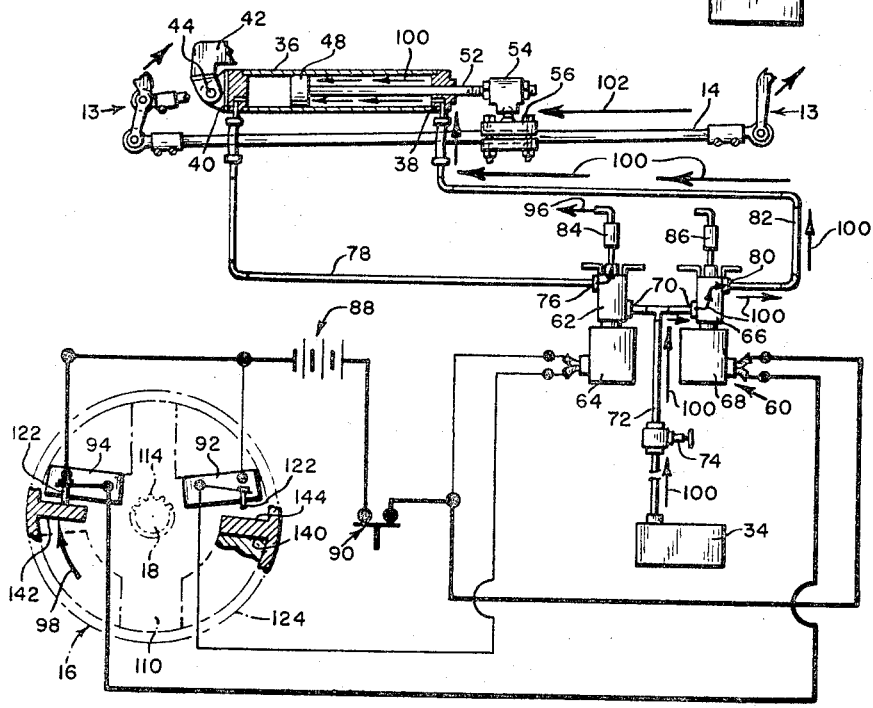
FIG. 4 is a schematic drawing, similar to FIG. 2, showing the operation of the electrical circuitry (in heavy lines) as the steering wheel is turned to the right as shown in FIG. 3.

Referring to FIGS. 3 and 4, it will be seen that when the steering wheel is turned to the right as indicated by the arrow 98, the microswitch 94 is closed to permit current to flow through the solenoid 68 which, in turn, operates the valve 66 to permit fluid flow in the direction of the arrows 100 to drive the piston 48 and the tie rod 14 in the direction of the arrow 102, thereby turning the wheels 12 to the right. The air displaced by the piston 48 moving in the direction of the arrow 102 is forced out through the exhaust port 84.

Figure 5:
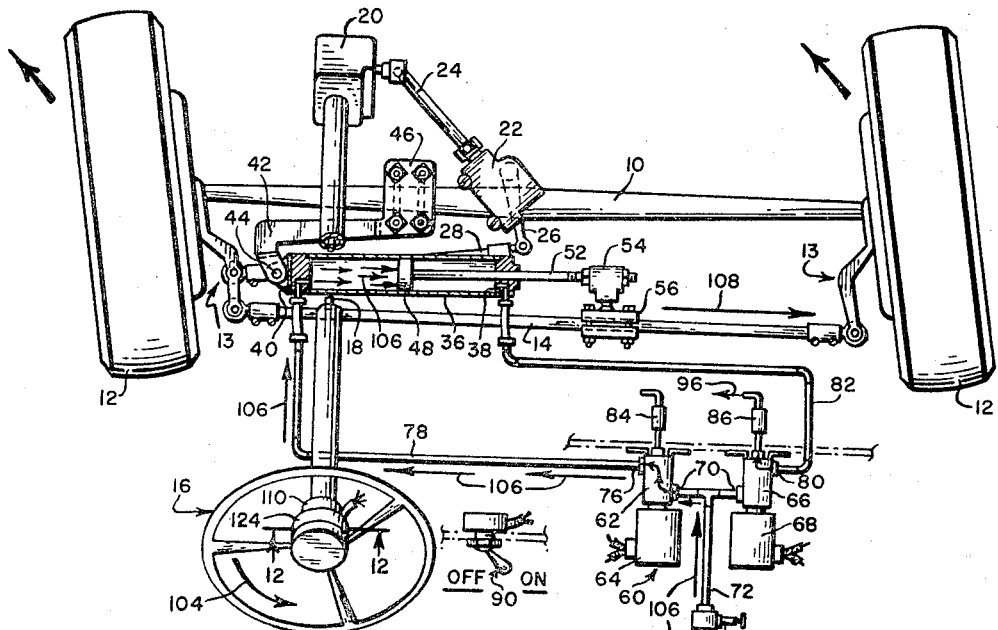
FIG. 5 is a diagrammatic view, similar to FIG. 1, showing the power steering apparatus energized, the steering wheel turned to the left and, consequently, the wheels turned to the left.
Figure 6:
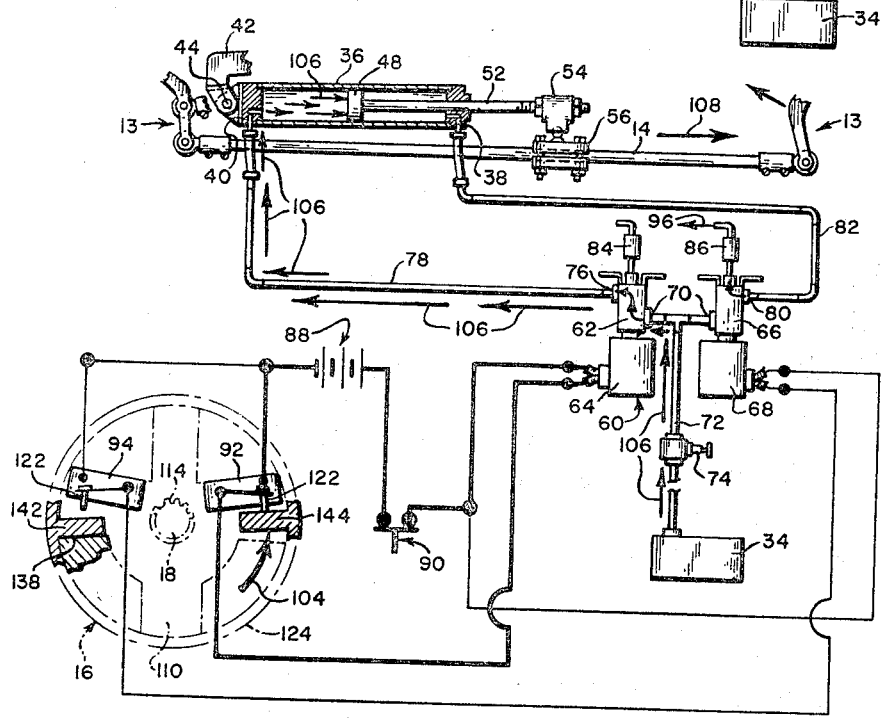
FIG. 6 is a schematic drawing, similar to FIG. 2, showing the operation of the electrical circuitry (in heavy lines) as the steering wheel is turned to the left.

Referring now to FIGS. 5 and 6, it will be seen that when the steering wheel 16 is turned in the direction of the arrow 104, the microswitch 92 is closed and current flows from the power source 88 through the microswitch 92 to the solenoid 64, thereby operating the valve 62 to permit fluid flow in the direction of the arrows 106. When the fluid flows in the direction of the arrows 106 through the input port 40, the piston 48 and tie rod 14 are moved in the direction of the arrow 108, and, therefore, the wheels 12 are turned to the left as seen in FIG. 5. The flow of current when the switch 92 is closed is indicated by heavy lines in FIG. 6.

Referring now to FIGS. 7 through 12, a preferred means for mounting the microswitches 92 and 94 will be discussed.

A platform member 110 is mounted at the upper end of the steering column 18 as shown in FIG. 7, the platform member 110 having a central opening 112 which receives the conventional spline 114 formed on the upper end of the steering column 18. A nut 116 is threaded on the conventional threaded portion 118 of the steering column 18 to secure the platform member 110. As seen in FIG. 9, the platform member 110 is circularly-shaped and concentrically mounted on the steering column 18. The microswitches 92 and 94 are securely mounted on the platform member 110 by means such as the screws 120 so that the plungers 122 of the microswitches extend generally tangentially to the axis of the steering column 18.

A cylindrically-shaped housing 124 is concentrically mounted on the hub of the steering wheel 16 as shown in FIG. 7, the housing 124 being arranged to receive the platform member 110 and to rotate thereon. The housing 124 is provided with a circumferentially extending inner shoulder 126 which supports the housing 124 on the platform 110. A snap ring 128 is disposed in a circumferentially extending groove 130 in the housing 124 to secure the housing 124 against movement upwardly from the platform member 110. Of course, the shoulder 126, and snap ring 128 are merely illustrative means for movably supporting the housing 124 on the platform member 110 and other such means could be developed by those skilled in the art. The housing 124 is securely fastened to the steering wheel 16 by means such as the screws 132 so that the housing 124 is rotated when the steering wheel 16 is rotated.

The platform member 110 is provided with a pair of abutments 134 and 136 as shown in FIGS. 9, 11 and 12, the abutment 134 having an engaging surface 138 and the abutment 136 having an engaging surface 140. The housing 124 is provided with a pair of generally oppositely disposed, radially inwardly extending switch actuator members 142 and 144, the member 142 being engageable with the surface 138 and the member 144 being engageable with the surface 140. The member 142 is arranged to engage the plunger 122 of the microswitch 94 and the member 144 is arranged to engage the plunger 122 of the microswitch 92. When the plungers 122 are pushed into their respective microswitches 92 and 94, the microswitches are closed.

The amount of relative rotation between the housing 124 and the platform member 110 is established by the position of the member 144 relative to the surface 140 and the position of the member 142 relative to the surface 138. That is, the housing 124 can be rotated in the direction of the arrow 146 (FIG. 11) until the member 144 abuts the surface 140 and the housing 124 can be rotated in the direction of the arrow 147 (FIG. 12) until the member 142 abuts the surface 138.

A coiled spring 148 is disposed within the abutment 134 resiliently to oppose the movement of the member 142 toward the surface 138 and a similar coiled spring 150 is disposed in the abutment 136 resiliently to oppose the movement of the member 144 toward the surface 140. Referring to FIGS. 9, 11 and 12, it will be seen that the spring 148 is carried in a cylindrical opening 152 in the abutment 134 and the spring 150 is carried in a similar cylindrical opening 154 in the abutment 136. It will also be seen that a screw 156 which is threadedly engaged with the abutment 134 is arranged to adjust the tension on the spring 148 and a similar screw 158 is threadedly engaged with the abutment 136 and arranged to adjust the tension on the spring 150. Access holes 160 are provided so that the screws 156 and 158 may be adjusted to adjust the sensitivity of the power steering apparatus.

Referring to FIG. 12, it will be seen that when the steering wheel is turned in the direction of the arrow 147, the member 142 moves against the spring 148 until the member 142 abuts the surface 138. When the member 142 is abutting the surface 138, the member 144 is engaged with the plunger 122 of the microswitch 92 to close the contacts of the microswitch 92. When the member 142 is engaged with the surface 138, further rotation of the steering wheel in the direction of the arrow 147 will rotate the steering column 18 in the direction of the arrow 147.

Referring to FIG. 11, it will be seen that when the member 144 is against the surface 140, the member 142 is engaged with the plunger 122 of the microswitch 94 to close the contacts of the microswitch 94. Thus, further movement of the steering wheel in the direction of the arrow 146 will rotate the steering column 18 in the direction of the arrow 146.

When the member 144 is urged against the spring 150, a torque is placed on the steering column 18, the torque being determined by the strength of the spring 150. By the time that the member 144 abuts the surface 140, the member 142 will engage the plunger 122 of the microswitch 94 to energize the power steering apparatus to assist in turning the wheels 12 to the right. When the member 142 is urged against the spring 148 toward the surface 138, a torque is placed on the steering column 18. Before the member 142 abuts the surface 138, the member 144 closes the microswitch 92 to energize the power steering apparauts to assist in turning the wheels 12 to the left.

What is claimed is:

1. A power steering apparatus comprising, in combination with a vehicle having a conventional manual steering system comprising a steering wheel, steering column, knuckle assemblies, and means drivingly connecting said steering column to said knuckle assemblies, a pressurized fluid source, fluid-actuated means for pivoting said knuckle assemblies, thereby steering said vehicle, electrically-operated valve means connected between said fluid source and said fluid-actuated means, first switch means for operating said valve means to pivot said knuckle assemblies in one direction, second switch means for operating said valve means to pivot said knuckle assemblies in the opposite direction, limit means providing for a predetermined amount of relative rotation between said steering wheel and said steering column, said limit means being arranged to provide at each extent of such relative rotation a driving connection between said steering wheel and said steering column, spring means resisting said relative rotation and providing a calibrated resistance throughout the extent thereof, said first and second switch means being arranged so that, when said steering wheel is rotated a second predetermined amount in one direction relative to said steering column, said first switch means is operated and, when said steering wheel is rotated a third predetermined amount in the opposite direction relative to said steering column, said second switch means is operated.

2. A power steering apparatus as in claim 1 including a pair of switch actuators carried by said steering wheel, said first and second switch means being mounted on said steering column, said first switch means being cooperatively associated with one of said actuators and said second switch means being cooperatively associated with the other of said actuators.

3. A power steering apparatus as in claim 2 wherein said spring means comprises first and second springs, wherein said switch actuators are generally oppositely disposed, radially extending members carried by the hub of said steering wheel, said first spring being disposed between said one actuator and said steering column resiliently to oppose rotation of said steering wheel in said one direction relative to said steering column and said second spring being disposed between said other actuator and said steering column resiliently to oppose rotation of said steering wheel in said opposite direction relative to said steering column.

4. A power steering apparatus as in claim 2 wherein said limit means comprises abutment means carried by said steering column, said abutment means being engageable with said actuators to establish the total permissible relative rotation between said steering column and said steering wheel.

5. A power steering apparatus comprising, in combination with a vehicle having a conventional manual steering system comprising a steering wheel, steering column, knuckle assemblies, and means drivingly connecting said steering column to said knuckle assemblies, a fluid source, fluid-actuated means for pivoting said knuckle assemblies, thereby steering said vehicle, electrically-operated valve means connected between said fluid source and said fluid-actuated means, said valve means being arranged to control said fluid-actuated means, thereby controllably pivoting said knuckle assemblies, switch means dominating said valve means, means for drivingly connecting said steering wheel to said steering column, said last mentioned connecting means being arranged to provide a predetermined amount of relative rotation between said steering wheel and said steering column, and spring means for resiliently resisting such relative rotation, said spring means being effective to provide a calibrated resistance from the initiation of such rotation throughout the extent thereof, said switch means being arranged to operate said valve means when said steering wheel is rotated a predetermined amount in either direction relative to said steering column.

6. A power steering apparatus comprising, in combination with a vehicle having a conventional manual steering system comprising a steering wheel, steering column, knuckle assemblies, a tie rod connecting said knuckle assemblies, and means drivingly connecting said steering column to said knuckle assemblies, a fluid cylinder carried by said vehicle, said cylinder having an input port at each of its ends, a piston carried in said cylinder for axial, fluid-driven reciprocation between said input ports, an axially extending piston rod penetrating one end of said cylinder, said piston rod being connected at one of its ends to said piston and at the other of its ends to said tie rod, a pressurized fluid source, a first fluid line connected between said fluid source and one of said input ports, first electrically-operated valve means connected in said first fluid line to control the flow of fluid to said one input port, a second fluid line connected between said fluid source and the other of said input ports, second electrically-operated valve means connected in said second fluid line to control the flow of fluid to said other input port, a first switch dominating said first electrically-operated valve means, a second switch dominating said second electrically-operated valve means, said first and second switches being carried on said steering column so that said first switch is closed when said steering wheel is rotated in one direction and said second switch is closed when said steering wheel is rotated in the other direction, an electrical power source, and circuit means for connecting said electrical power source to said first and second electrically-operated valve means through said first and second switches.

7. A power steering apparatus as in claim 6 wherein said fluid cylinder is pivotally connected to said vehicle and wherein said piston rod is pivotally connected to said tie rod.

8. A power steering apparatus as in claim 6 further comprising means providing for a first predetermined amount of relative rotation between said steering wheel and said steering column, spring means for resisting said relative rotation, said first switch being positioned on said steering column so that, when said steering wheel is rotated a second predetermined amount in said one direction relative to said steering column, said first switch is closed and said second switch being positioned on said steering column so that, when said steering wheel is rotated a third predetermined amount in said other direction relative to said steering column, said second switch is closed, said first amount of rotation including said second and third amounts of rotation.

References Cited

UNITED STATES PATENTS

| | | | |
|---|---|---|---|
| 1,779,444 | 10/1930 | Norviel | 180—79.1 X |
| 2,962,108 | 11/1960 | Bidwell | 180—79.2 |
| 2,977,813 | 4/1961 | Banker | 180—79.2 X |
| 3,191,109 | 6/1965 | Hepner | 180—79.1 |

BENJAMIN HERSCH, *Primary Examiner.*

L. DANIEL MORRIS, Jr., *Assistant Examiner.*

U.S. Cl. X.R.

180—79.1